(12) United States Patent
Wang et al.

(10) Patent No.: US 12,100,825 B1
(45) Date of Patent: Sep. 24, 2024

(54) BATTERY BOX HAVING HEAT DIRECTING FUNCTION, HEAT DIRECTING STRUCTURE, AND METHOD

(71) Applicant: JIAXING MODU NEW ENERGY CO., LTD, Zhejiang (CN)

(72) Inventors: Bo Wang, Zhejiang (CN); Xingcai Qin, Zhejiang (CN); Cunliang Liu, Zhejiang (CN)

(73) Assignee: JIAXING MODU NEW ENERGY CO., LTD, Zhejiang (CN)

( * ) Notice: Subject to any disclaimer, the term of this patent is extended or adjusted under 35 U.S.C. 154(b) by 0 days.

(21) Appl. No.: 18/698,461

(22) PCT Filed: Oct. 19, 2022

(86) PCT No.: PCT/CN2022/126208
§ 371 (c)(1),
(2) Date: Apr. 4, 2024

(87) PCT Pub. No.: WO2023/066302
PCT Pub. Date: Apr. 27, 2023

(30) Foreign Application Priority Data

Oct. 19, 2021 (CN) .......................... 202111213697.7

(51) Int. Cl.
*H01M 10/6569* (2014.01)
*H01M 10/613* (2014.01)
(Continued)

(52) U.S. Cl.
CPC ..... *H01M 10/6569* (2015.04); *H01M 10/613* (2015.04); *H01M 10/6554* (2015.04);
(Continued)

(58) Field of Classification Search
CPC .......... H01M 10/6559; H01M 10/613; H01M 10/6554; H01M 10/658; H01M 50/505; H01M 50/325
See application file for complete search history.

(56) References Cited

FOREIGN PATENT DOCUMENTS

| CN | 102576833 A | 7/2012 |
|---|---|---|
| CN | 110739501 A | 1/2020 |

(Continued)

OTHER PUBLICATIONS

CN 210607348 English Translation (Year: 2020).*
WO 2021094149 English Translation (Year: 2021).*

*Primary Examiner* — Jimmy Vo
(74) *Attorney, Agent, or Firm* — SALIWANCHIK, LLOYD & EISENSCHENK

(57) ABSTRACT

The present invention provides a battery box having a heat directing function, a heat directing structure, and a method. The battery box comprises: a box body, the inner space of the box body being divided, by a heat partition plate, into a battery compartment in an upper portion and a heat concentration and distribution area in a lower portion; and at least one cell, the cell comprising an upper end face and a housing, the upper end face being provided with cell pressure relief valve, the cell being provided in the battery compartment, and the upper end face being provided to face the heat partition plate. The heat partition plate is provided with a heat directing area. An outlet of the cell pressure relief valve corresponds to the heat directing area. A heat flow discharged by the cell pressure relief valve enters the heat concentration and distribution area through the heat directing area. When thermal runaway occurs in the cell, the heat flow discharged by the pressure relief valve flows from the pressure relief valve to the heat directing area, then to the heat concentration and distribution area, and then to the (Continued)

outside of the box, and the bulk density of the heat flow is reduced step by step, thereby achieving the purpose of heat directing.

11 Claims, 1 Drawing Sheet

(51) Int. Cl.
    *H01M 10/6554*     (2014.01)
    *H01M 10/658*     (2014.01)
    *H01M 50/325*     (2021.01)
    *H01M 50/505*     (2021.01)

(52) U.S. Cl.
    CPC ....... *H01M 10/658* (2015.04); *H01M 50/325* (2021.01); *H01M 50/505* (2021.01)

(56) References Cited

FOREIGN PATENT DOCUMENTS

| | | | | |
|---|---|---|---|---|
| CN | 210607348 U | * | 5/2020 | |
| CN | 113644360 A | | 11/2021 | |
| WO | WO-2021094149 A1 | * | 5/2021 | .......... H01M 10/613 |

\* cited by examiner

BATTERY BOX HAVING HEAT DIRECTING FUNCTION, HEAT DIRECTING STRUCTURE, AND METHOD

CROSS REFERENCE TO RELATED APPLICATIONS

This application is a National Stage of International Application No. PCT/CN2022/126208, filed Oct. 19, 2022, which claims priority to Chinese Patent Application No. 202111213697.7, filed Oct. 19, 2021; both of which are hereby incorporated by reference in their entirety.

TECHNICAL FIELD

The present disclosure belongs to the technical field of batteries, and relates to a battery box having heat directing function, a heat directing structure and a heat directing method.

BACKGROUND ART

With the continuous improvements of the performance of electric vehicles, the safety requirements for electric vehicles are increased continuously. At present, relevant standards specifies that no open flame is permitted to appear outside a battery system in 5 minutes or a longer duration in a case that the battery module is squeezed, short-circuited, or overcharged, etc., in order to ensure that the passengers have enough time to escape.

The thermal runaway of a battery module is caused by the thermal runaway of an individual battery cell, which leads to the thermal runaway of more surrounding normal batteries through heat propagation. The thermal runaway and spontaneous ignition of an individual Li-ion battery is inevitable. The goal of heat safety management for grouped batteries is to block or inhibit the heat propagation from an individual battery in thermal runaway state to surrounding batteries better.

The probability of spontaneous ignition of individual batteries can only be decreased but can't be eliminated, and the blasting, burning and explosion of individual batteries are inevitable and must be prevented and controlled; individual cylindrical batteries have limited size and total capacity, and the direction of efforts in the industry is to minimize the effect of blasting, burning and explosion of individual batteries on the entire battery pack, to prevent the burning and explosion of the entire battery pack; a great deal of hot gas streams, even flames, are blasted during the burning and explosion of the individual battery, so it is an urgent task to be solved in the industry to direct the hot streams as soon as possible to minimize the heat effect on neighboring batteries (by blocking the heat prorogation); the higher the capacity of the individual cylindrical battery is, the greater the control necessity is during thermal runaway, especially, for new Type 4680 individual batteries, control measures against thermal runaway are necessary and urgent.

SUMMARY OF THE INVENTION

In view of the drawbacks in the prior art, an object of the present disclosure is to provide a battery box having a heat directing function, a heat directing structure and a method. In the battery box provided by the present disclosure, in the case that a thermal runaway phenomenon occurs to an individual battery, a high heat stream discharged by a pressure relief valve of the individual battery is ejected at a high pressure to avoid damage to passengers (the pressure relief valve discharges towards the bottom of vehicles), and then enters into a heat directing area at a medium pressure, then to a heat concentration and distribution area at a low pressure, and finally to the exterior of the box without pressure; through that process, the volume density (power intensity) of the heat stream is decreased step by step, thereby thermal protection for the normal batteries in the battery compartment in the upper portion, thermal protection for the persons and assets above the battery pack, and a thermal directing structure for directing the heat stream to a safe area outside the battery box are realized.

To attain the above object, the present disclosure employs the following technical solution:

In a first aspect, the present disclosure provides a battery box having a heat directing function, the battery box comprises:

a box body, an internal space of the box body is divided by a heat separation plate into a battery compartment in an upper layer and a heat concentration and distribution area in a lower layer; and at least one individual battery, the individual battery comprises an upper end face and a shell, wherein the upper end face is provided with a battery pressure relief valve, the individual battery is arranged in the battery compartment, and the upper end face is arranged to face the heat separation plate;

the heat separation plate is provided with a heat directing area, an outlet of the battery pressure relief valve corresponds to the heat directing area, and a heat stream discharged from the battery pressure relief valve enters the heat concentration and distribution area through the heat directing area.

When the thermal runaway phenomenon occurs to the individual battery in the battery box provided by the present disclosure, a heat stream at high temperature discharged from the pressure relief valve of the individual battery is blasted at a high pressure towards the bottom of vehicles to avoid damage to passengers (the pressure relief valve discharges towards the bottom of vehicles), and then enters into the heat directing area at a medium pressure, then to a heat concentration and distribution area at a low pressure, and finally to the exterior of the box without pressure; through that process, the volume density (power intensity) of the heat stream is decreased step by step, realizing thermal protection for the normal batteries in the upper battery compartment, thermal protection for the persons and properties above the battery pack and a heat directing structure for directing the heat stream to a safe area outside the battery box.

As a preferred technical solution of the present disclosure, the upper end face of the individual battery is at least further provided with a pole, and the poles of a plurality of individual batteries are electrically connected in series or in parallel through busbar; and the busbar is arranged between the outlets of the battery pressure relief valves and the heat directing areas corresponding to the outlets.

The busbar is fixed with the periphery of the battery pressure relief valve of the individual battery through an electrical connecting element having a tubular structure, two ends of the electrical connecting element cover the pressure relief valve and the heat directing area respectively, side walls of the electrical connecting element, the battery pressure relief valve of the individual battery and the heat separation plate form a closed heat directing area, and the heat generated by the individual battery enters into the heat concentration and distribution area through the heat directing area after the heat is discharged from the battery pressure relief valve.

It should be noted that the battery pressure relief valve defined in the present disclosure is required to directly face the heat directing area, that is, there is no other structures blocked between the battery pressure relief valve and the heat directing area, so that the heat discharged by the battery pressure relief valve can directly flow through the heat directing area and enter the heat concentration and distribution area. Therefore, for a cylindrical battery, since the battery pole and the battery pressure relief valve are arranged on the same end face of the battery at the same position, and then the busbar will block the outlet of the battery pressure relief valve after the battery pole is connected to the busbar. Therefore, in the present disclosure, an electrical connecting element is innovatively provided on the busbar to electrically connect the battery pole without decreasing the busbar throughput, a through-hole on the electrical connecting element enables the battery pressure relief valve to face the heat directing area directly, thus avoiding the blockage by the busbar between the two. In addition, the closed side walls of the electrical connecting element, the end face of the battery and the one-way communication structure form a closed space, and the outer side of the side walls of the electrical connecting element is filled with a solid heat-insulating material, thereby the heat stream discharged by the pressure relief valve is confined in the heat directing area, and will not overflow into the battery compartment or affect the neighboring batteries. Of course, for prismatic batteries and pouch batteries, on which the battery pole and the battery pressure relief valve are separated from each other, the busbar may not block the battery pressure relief valve after the battery pole is connected to the busbar. In that case, it is unnecessary to provide an electrical connecting element.

In the present disclosure, there is no particular requirement or special restriction on the structure of the electrical connecting element, and electrical connecting elements in any structure that could achieve the above-mentioned function can be used in the present disclosure. As an example, it is optionally the crowned cold-welded structure disclosed in the Patent Publication No. CN113241491A.

As a preferred technical solution of the present disclosure, a one-way communication structure for communicating in one direction is provided within the heat directing area at a position of the heat separation plate corresponding to the direction from the heat directing area to the heat concentration and distribution area, and the one-way communication structure is opened once it is subjected to a preset pressure or a preset temperature at a side facing the heat concentration and distribution area.

In the present disclosure, the one-way communication structure is in a closed state under normal conditions, and it will be opened towards one direction when it is under pressure or heated, so as to ensure that the heat stream produced by the pressure relief valve can only flow in one direction from the pressure relief valve to the heat directing area and finally to the heat concentration and distribution area, so that the heat generated by the pressure relief valve at a high pressure is introduced into the heat concentration and distribution area at a low pressure through the heat directing area at a medium pressure and then to the exterior of the box without pressure, thereby the volume density of the heat stream is decreased step by step, and the effect of heat propagation of the heat stream accumulated in the limited space in a short time on the neighboring batteries, which may finally result in a risk of burning and explosion of the neighboring batteries, is effectively prevented.

It should be noted that the one-way communication structure described in the present disclosure is optionally a valve that will be opened towards one direction under heat and is at the side of the heat directing area, such as a one-way gate that uses a low melting point solid material as a gate lock, or is optionally a non-penetrating shallow nick formed in the surface of the heat separation plate, or is optionally a notch or valve that can be opened towards one direction under pressure.

As a preferred technical solution of the present disclosure, the battery box further comprises a heat discharging structure which is connected to the heat concentration and distribution area, and the heat discharging structure comprises a pressure relief pipe and a box body pressure relief valve, wherein one end of the pressure relief pipe is connected to the periphery of the heat concentration and distribution area to form a connection port that is located at a higher position in the heat concentration and distribution area, and the box body pressure relief valve is located at a connection end face between the pressure relief pipe and the heat concentration and distribution area, or located at the other end of the pressure relief pipe.

The box body pressure relief valve in the present disclosure is a one-way pressure relief valve, which relieves the pressure from the interior of the box body to the exterior of the box body in one way and has two-way water tightness.

It should be noted that the external pressure relief pipe in the present disclosure may be omitted. When the local space outside the box body (not outside the vehicle) can bear the heat accumulation, the heat generated by the pressure relief valve may be directly discharged out via the box body pressure relief valve after the heat is accumulated in the heat concentration and distribution area, and it is unnecessary to transfer the heat through the external pressure relief pipe; the internal pressure relief pipe in the present disclosure is usually arranged at a site above the heat concentration and distribution compartment to guide the rising heat stream from the interior of the box to the exterior of the box. Since the interior of the box is generally a heat sensitive area, a heat-insulating sleeve is fitted on the internal pressure relief pipe in the present disclosure to prevent the heat stream from affecting the thermal environment around the internal pressure relief pipe through the pipe wall. Under this scenario, the box body pressure relief valve may be arranged at a connection portion between the internal pressure relief pipe and the heat concentration and distribution compartment, or may be arranged at a connection portion between the internal pressure relief pipe and the box wall.

As a preferred technical solution of the present disclosure, one end or a pipe body of the pressure relief pipe is intersected and connected with a wall of the box body to form a heat steam outflow opening; and some portions of the pressure relief pipe in a heat sensitive area inside or outside the box through which the pressure relief pipe passes is wrapped with a heat-insulating sleeve.

As a preferred technical solution of the present disclosure, the heat concentration and distribution compartment is at least connected to a bottom portion of the box body.

The heat concentration and distribution area at least comprises a bottom compartment located in the bottom portion of the box body.

Optionally, in the present disclosure, a plurality of columnar supporting members are provided in the bottom compartment for improving the strength of the heat separation plate and supporting the great pressure applied by the weight of a plurality of individual batteries in the battery compartment, while ensuring the fluidity of the liquid medium and the vaporized gas in the heat concentration and distribution area. Optionally, the supporting members in the present disclosure are gratings with lateral openings, the gratings are horizontally laid and could bear longitudinal pressure.

As a preferred technical solution of the present disclosure, the heat concentration and distribution area further comprises a lateral compartment which is located in at least one side wall of the box body, the lateral compartment is located higher than the bottom compartment, and the lateral compartment is in communication with the bottom compartment.

Since the entire battery box is generally arranged on the chassis of a vehicle, the height extensibility of the battery box is limited by the passing ability of the distance between vehicles and the ground. Although the volume of the heat concentration and distribution compartment in the present disclosure can be increased by means of the bottom area of the entire box plus the limited height, the volume of the individual bottom compartment is still inadequate. Therefore, a lateral compartment is arranged in a lateral space of the battery box that allows expansion, thereby expanding the space of the heat concentration and distribution area, and the heat stream discharged by the pressure relief valve can escape from the lateral compartment through the bottom compartment, thereby promoting the rapid discharging of the heat stream, and any backlash on the individual battery in thermal runaway caused by an instantaneous excessive pressure of the heat stream in the bottom compartment can be prevented. The box body pressure relief valve may be arranged on a box wall of the lateral compartment, and the surface of the lateral compartment adjacent to the battery compartment may be provided with a thermal insulating material to protect the individual batteries in the battery compartment from being affected.

As a preferred technical solution of the present disclosure, the heat concentration and distribution area is provided with a medium of large heat capacity that is nonflammable, said medium of large heat capacity decreases the temperature of the heat concentration and distribution compartment by absorbing heat during temperature rise or phase change of the medium of large heat capacity after the medium of large heat capacity is subjected to heat.

In the present disclosure, the medium of large heat capacity in the heat concentration and distribution area is vaporized when it is subjected to heat, and absorbs a great deal of heat during the phase change. Thus, on one hand, it advantageously reduces the heat of the heat stream blasted from the pressure relief valve; on the other hand, the vaporized hot gas has a characteristic of autonomous upward flowing and stratification from the medium of large heat capacity, which contributes to the discharge of the hot gas to the exterior of the box through heat discharging structure while the medium of large heat capacity remains at the bottom portion of the heat concentration and distribution compartment.

As a preferred technical solution of the present disclosure, the medium of large heat capacity is a liquid medium with high fluidity for quickly balancing local high heat within the heat concentration and distribution compartment, and the medium of large heat capacity changes into a gas state through phase change and is discharged out of the box through the heat discharging structure when it is subjected to high heat, so as to maintain the heat concentration and distribution compartment below a preset heat threshold temperature.

It should be noted that there is no particular requirement or particular restriction on the specific material of the medium of large heat capacity in the present disclosure. For example, the medium of large heat capacity is optionally water, oil or a mixed oil-water liquid.

As a preferred technical solution of the present disclosure, the medium of large heat capacity is configured with color.

It should be noted that the medium of large heat capacity being configured with color in the present disclosure refers to that the medium of large heat capacity itself is of color, or refers to that a color produced by adding a pigment to the medium of large heat capacity.

The heat concentration and distribution compartment in the present disclosure is arranged at the bottom of the battery box. Owing to the fact that the bottom of the battery box is the closest to the ground, it may be easily damaged and fractured for being scratched, and the damage or fracture may not be perceived easily. Since the medium of large heat capacity is arranged at the bottom of the box body, it will seep out of the box body once the box body is damaged and the water tightness of the box body is destroyed. Even if the liquid has dried up outside the box, the medium of large heat capacity with color can still leave a trace that is easy to be discovered outside the box, and any question of the heat concentration and distribution compartment can be discovered as soon as possible, and manual intervention and maintenance can be carried out conveniently.

In a second aspect, the present disclosure provides a heat directing structure of a battery, the heat directing structure comprising the battery box described in the first aspect, wherein a heat-insulating adhesive layer and a solid heat-insulating layer are sequentially arranged on one surface of the heat separation plate adjacent to the battery compartment from bottom to top, an end of each of the individual batteries is fixed to the heat separation plate via the heat-insulating adhesive layer, and the solid heat-insulating layer is filled between the shells of the individual batteries near the end for heat insulation between the heating shell of the individual battery in thermal runaway near the end and the parts of neighboring normal individual batteries corresponding to the heating shell.

As a preferred technical solution of the present disclosure, a fluid temperature equalizing layer is further provided above the solid heat-insulating layer, and at least a portion of the shell of the individual battery is immersed in the fluid temperature equalizing layer.

It should be noted that the heat-insulating adhesive layer in the present disclosure may be polyurea. The materials of the solid heat-insulating layer is optionally polyurethane or phenolic aldehyde, the upper surface and/or lower surface of which is coated with an insulating film. The fluid temperature equalizing layer is optionally silicone oil. Since the highly heat-insulating foam material is a polymer in power form, which has the possibility of being dispersed under the continuous impact of a fluid, the lower surface of the foam material is scaled with a heat-insulating adhesive layer, and the upper surface of the foam material is sealed with an insulating film that has adhesive on one side.

In a third aspect, the present disclosure provides a method of directing heat for an individual battery with the heat directing structure described in the second aspect, said method comprises:

when the individual battery overheats inside, a heat stream is blasted out via the battery pressure relief valve, then the heat stream enters the heat concentration and distribution area through the heat directing area, in which the heat density of the heat stream will be decreased due to the first volume expansion of the heat directing area; in the heat concentration and distribution area, a second volume expansion is realized to decrease heat density and decrease the temperature after heat is collected, a hot gas is discharged out of the box body through a heat discharging mechanism for realizing a third volume expansion and a temperature drop, thereby the heat directing of the heat stream in a stage-by-stage manner from the interior of the shell of the battery to a space outside the box body is achieved;

blocking the heat exchange between the heat concentration and distribution compartment with a great deal of heat and the battery compartment at a normal temperature by the heat-insulating adhesive layer and the solid heat-insulating layer.

The heat directing method according to the present disclosure further comprises the following steps: during the flow of the medium in the fluid temperature equalizing layer, the heat on the outer surface of the shell of the individual battery in thermal runaway immersed in the fluid temperature equalizing layer is quickly carried away and evenly distributed into the fluid temperature equalizing layer and the large heat capacity of other normal individual batteries. Thus, the heat effect on the surfaces of the shells of the neighboring normal battery is minimized.

Compared with the prior art, the present invention attains the following beneficial effects:

When thermal runaway phenomenon occurs to an individual battery in the battery box provided by the present disclosure, a heat stream at high temperature discharged by the pressure relief valve of the individual battery is blasted at a high pressure towards the bottom of vehicles to avoid damage to passengers (the pressure relief valve discharges towards the bottom of vehicles), and then enters to a heat directing area at a medium pressure, then to a heat concentration and distribution area at a low pressure, and finally to the exterior of the box without pressure; through that process, the volume density (power intensity) of the heat stream is decreased step by step, thereby achieving thermal protection for the normal batteries in the battery compartment in the upper portion, thermal protection for the persons and properties above the battery pack, and a heat directing structure for directing the heat stream to a safe area outside the battery box.

In the figures: 1—box body; 2—individual battery; 3—heat concentration and distribution area; 4—battery compartment; 5—pole; 6—busbar; 7—electrical connecting element; 8—box body pressure relief valve; 9—pressure relief pipe; 10—pressure relief valve; 11—heat—insulating adhesive layer; 12—fluid temperature equalizing layer; 13—solid heat—insulating layer.

DETAILED DESCRIPTION OF EMBODIMENTS

In the description of the present disclosure, it will be appreciated that the orientation or positional relations indicated by terms "central", "longitudinal", "transverse", "above", "below", "front", "rear", "left", "right", "vertical", "horizontal", "top", "bottom", "inside" or "outside", etc., are based on the orientation or positional relations indicated in the accompanying drawings. They are used only to ease and simplify the description of the present disclosure, rather than indicating or implying that the involved device or component must have a specific orientation or must be constructed and operated in a specific orientation. Therefore, the use of these terms shall not be deemed as constituting any limitation to the present disclosure. In addition, the terms "first" and "second", etc., are used only for an illustrative purpose, and shall not be interpreted as indicating or implying relative importance or implicitly indicating the quantity of the indicated technical feature. Hence, a feature defined by "first" or "second" and the like may explicitly or implicitly indicate comprising one or more such features. In the description of the present disclosure, unless otherwise specified, "a plurality" means two or more.

It should be noted that in the description of the present disclosure, unless otherwise specified and defined explicitly, the terms "arrange", "interconnect", and "connect", etc., shall be interpreted broadly in their general meanings, for example, a connection may be a fixed connection, also a detachable connection, or an integral connection; the connection may be a mechanical connection or an electrical connection; the connection may be a direct connection or also an indirect connection via an intermediate medium, an internal communication between two elements. Those having ordinary skills in the art can understand the specific meanings of the terms in the present disclosure in their contexts.

Next the technical solution of the present disclosure will be further detailed by specific embodiments.

Figure 1:
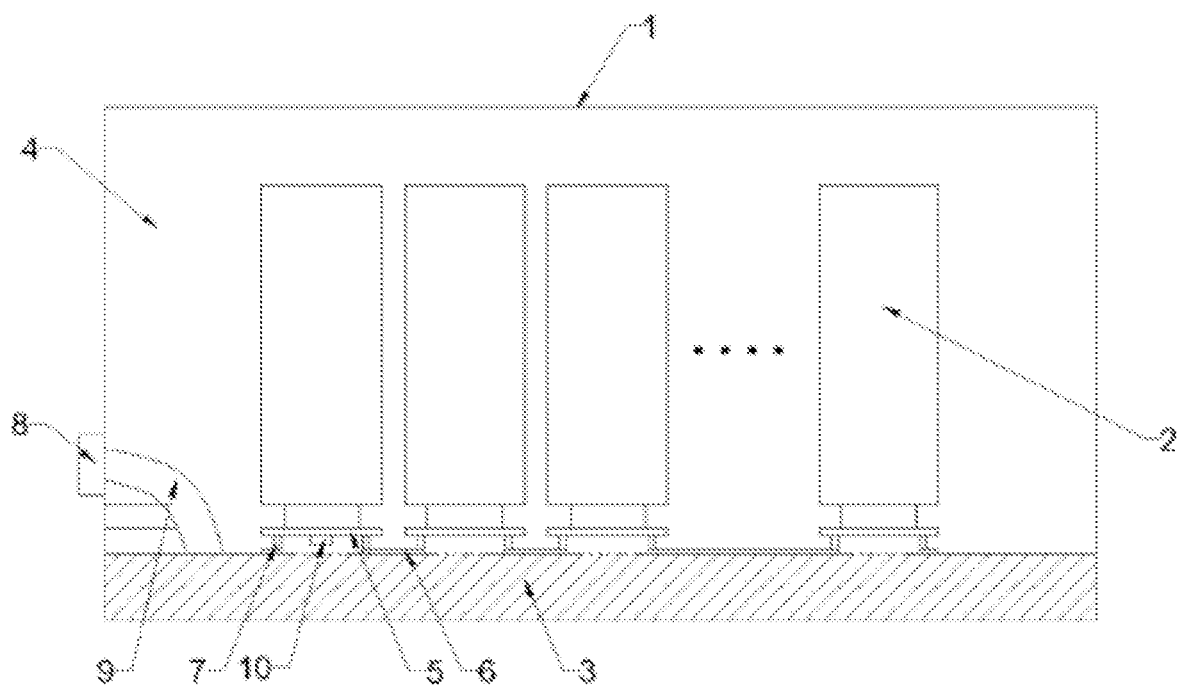
FIG. 1 is a schematic structural diagram of a battery box provided in an embodiment of the present disclosure.

In a specific embodiment, the present disclosure provides a battery box having a heat directing function. As shown in FIG. 1, the battery box comprises:

a box body 1, an internal space of the box body 1 is divided by a heat separation plate into a battery compartment 4 in an upper portion and a heat concentration and distribution area 3 in a lower portion; and at least one individual battery 2, the individual battery 2 comprising an upper end face and a shell, wherein the upper end face is provided with a battery pressure relief valve 10, the individual battery 2 is arranged in the battery compartment 4, and the upper end face is arranged towards the heat separation plate;

the heat separation plate is provided with a heat directing area, an outlet of the battery pressure relief valve 10 corresponds to the heat directing area, and a heat stream discharged from the pressure relief valve 10 of the individual battery 2 enters into the heat concentration and distribution area 3 through the heat directing area.

When a thermal runaway phenomenon occurs to an individual battery 2 in the battery box provided by the present disclosure, a heat stream at high temperature discharged from the pressure relief valve 10 of the individual battery 2 is blasted at a high pressure towards the bottom of vehicles to avoid damage to passengers (the pressure relief valve 10 discharges towards the bottom of vehicles), and then enters into the heat directing area at a medium pressure, then to the heat concentration and distribution area 3 at a low pressure, and finally to the exterior of the box without pressure; through that process, the volume density (power intensity) of the heat stream is decreased step by step, thereby achieving thermal protection for the normal battery in the battery compartment 4 in the upper portion, thermal protection for the persons and properties above the battery pack, and a heat directing structure for directing the heat stream to a safe area outside the battery box.

Furthermore, the upper end face of the individual battery 2 is at least further provided with a pole 5, and the poles 5 of a plurality of individual batteries 2 are electrically connected in series or in parallel through busbar 6; and the busbar 6 is arranged between the outlets of the battery pressure relief valves 10 and corresponding heat directing areas.

the busbar 6 is fixed to the periphery of the battery pressure relief valve 10 of the individual battery 2 through an electrical connecting element 7 having a tubular structure, two ends of the electrical connecting element 7 cover the battery pressure relief valve 10 and the heat directing area respectively, side walls of the electrical connecting element 7, the battery pressure relief valve 10 of the individual battery 2 and the heat separation plate form a closed heat directing area, and the heat generated by the individual battery 2 enters into the heat concentration and distribution area 3 through the heat directing area after the heat is discharged from the battery pressure relief valve 10.

It should be noted that the battery pressure relief valve 10 defined in the present disclosure is required to face the heat directing area directly, that is, there is no other structure blocked between the battery pressure relief valve and the heat directing area, so that the heat discharged from the battery pressure relief valve 10 of the individual battery 2 can directly flow through the heat directing area and enter the heat concentration and distribution area 3. Therefore, for a cylindrical battery, since the battery pole 5 and the battery pressure relief valve 10 are on the same end face of the battery and at the same position, the busbar 6 will block the outlet of the battery pressure relief valve 10 after the battery pole 5 is connected to the busbar 6. Therefore, in the present disclosure, an electrical connecting element 7 is innovatively provided on the busbar 6 to electrically connect the battery pole 5 without decreasing the busbar throughput; and the electrical connecting element 7 is provided with a through-hole, which enables the battery pressure relief valve 10 to face the heat directing area directly, thus avoiding the blockage by the busbar 6 between the two. In addition, the closed side walls of the electrical connecting element 7, the end face of the battery and the one-way communication structure form a closed space, and a solid heat-insulating material is filled at the outer side of the side walls of the electrical connecting element 7, thereby the heat stream discharged from the pressure relief valve 10 is confined in the heat directing area, and will not overflow into the battery compartment 4 or affect the neighboring batteries. Of course, for prismatic battery or pouch battery, on which the battery pole 5 and the battery pressure relief valve 10 are separated from each other, the busbar 6 will not block the battery pressure relief valve 10 after the battery pole 5 is connected to the busbar 6. In that case, it is unnecessary to provide the electrical connecting element 7.

In the present disclosure, there is no particular requirement and special restriction on the structure of the electrical connecting element, and electrical connecting element in any structure that could achieve the above-mentioned function can be used in the present disclosure. As an example, it is optionally the crowned cold-welded structure disclosed in the Patent Publication No. CN113241491A.

Furthermore, a one-way communication structure is provided in the heat directing area at a position of the heat separation plate corresponding to the direction from the heat directing area to the heat concentration and distribution area 3, and the one-way communication structure is opened when one side of the heat concentration and distribution area 3 is subjected to a preset pressure or preset temperature.

In the present disclosure, the one-way communication structure is in a closed state under normal conditions, and it will be opened toward one direction when it is under pressure or heated, so as to ensure that the heat stream produced by the pressure relief valve 10 can only flow in one direction from the pressure relief valve 10, to the heat directing area and then to the heat concentration and distribution area 3 sequentially, so that the heat generated by the pressure relief valve 10 at a high pressure is introduced into the heat concentration and distribution area 3 at a low pressure through the heat directing area at a medium pressure and then to the exterior of the box without pressure, thereby the volume density of the heat stream is decreased step by step, and the effect of heat propagation of the heat stream accumulated in the limited space in a short time on the neighboring normal batteries, which may finally result in a risk of burning and explosion of the neighboring normal batteries, is effectively prevented.

It should be noted that the one-way communication structure described in the present disclosure is optionally a valve that will be opened toward one direction under heat, which is at the side of the heat directing area, such as a one-way gate that uses a low melting point solid material as a gate lock, or the one-way communication structure is a non-penetrating shallow nick formed in the surface of the heat separation plate, or a notch or valve that can be opened toward one direction under pressure.

Furthermore, the battery box further comprises a heat discharging structure connected to the heat concentration and distribution area 3, and the heat discharging structure comprises a pressure relief pipe 9 and a box body pressure relief valve 8, wherein one end of the pressure relief pipe 9 is connected to the periphery of the heat concentration and distribution area 3 to form a connection port, the connection port is located at a higher position of the heat concentration and distribution area 3, and the box body pressure relief valve 8 is located at an connection end face between the pressure relief pipe 9 and the heat concentration and distribution area 3, or located at the other end of the pressure relief pipe 9.

The box body pressure relief valve 8 in the present disclosure is a one-way pressure relief valve 10, which relieves the pressure from the interior of the box body 1 to the exterior of the box body 1 and has two-way water tightness.

It should be noted that the external pressure relief pipe 9 in the present disclosure may be omitted. If the local space outside the box body 1 (not outside the vehicle) can bear the heat accumulation, the heat generated by the pressure relief valve 10 can be directly discharged out via the box body pressure relief valve 8 after the heat is accumulated in the heat concentration and distribution area 3, and it is unnecessary to transfer the heat through the external pressure relief pipe 9; the internal pressure relief pipe 9 in the present disclosure is generally arranged at a site above the heat concentration and distribution compartment to guide the rising heat stream from the interior of the box to the exterior of the box. Since the interior of the box is generally a heat sensitive area, a heat-insulating sleeve is fitted on the internal pressure relief pipe 9 in the present disclosure to prevent the heat stream from affecting the thermal environment around the internal pressure relief pipe through the pipe wall. In that scenario, the box body pressure relief valve 8 may be arranged at a connection portion between the internal pressure relief pipe and the heat concentration and distribution compartment or at a connection portion between the internal pressure relief pipe and the box wall.

Furthermore, one end or a pipe body of the pressure relief pipe 9 is intersected and connected with a wall of the box body 1 to form a heat stream outflow opening; and some portions of the pressure relief pipe 9 in a heat sensitive area inside or outside the box is wrapped with a heat-insulating sleeve.

Furthermore, the heat concentration and distribution compartment is at least connected to a bottom portion of the box body 1.

The heat concentration and distribution area 3 at least comprises a bottom compartment located in the bottom portion of the box body 1.

Optionally, in the present disclosure, a plurality of columnar supporting members are provided in the bottom compartment for improving the strength of the heat separation plate and supporting the great pressure of the weight of a plurality of individual batteries 2 in the battery compartment 4, while ensuring the fluidity of the medium of large heat capacity and the vaporized gas in the heat concentration and distribution area 3. Optionally, the supporting members in the present disclosure are gratings with lateral openings, and the gratings are horizontally laid and could bear longitudinal pressure.

Furthermore, the heat concentration and distribution area 3 further comprises a lateral compartment, which is located in at least one side wall of the box body 1, the lateral compartment is located higher than the bottom compartment, and the lateral compartment is in communication with the bottom compartment.

Since the entire battery box is generally arranged on the chassis of a vehicle, the height extensibility of the battery box is limited by the passing ability of the distance between vehicles and the ground. Although the volume of the heat concentration and distribution compartment in the present disclosure can be increased by means of the bottom area of the entire box plus the limited height, the volume of the individual bottom compartment is still inadequate. Therefore, a lateral compartment is arranged at a lateral space of the battery box that allows expansion, thereby expanding the space of the heat concentration and distribution area 3, and the heat stream discharged from the pressure relief valve 10 can escape from the lateral compartment through the bottom compartment, thereby promoting the rapid discharge of the heat stream, and any backlash on the individual battery 2 in thermal runaway caused by an instantaneous excessive pressure of the heat stream in the bottom compartment can be prevented. The box body pressure relief valve 8 may be arranged on a box wall of the lateral compartment, and the surface of the lateral compartment close to the battery compartment 4 may be provided with a thermal insulating material to protect the individual batteries 2 in the battery compartment 4 from being affected.

Furthermore, the heat concentration and distribution area 3 is provided with a medium of large heat capacity that is nonflammable, said medium of large heat capacity decreases the temperature of a heat concentration and distribution compartment by absorbing heat during temperature rise or phase change of the medium of large heat capacity after the medium of large heat capacity is subjected to heat.

In the present disclosure, the medium of large heat capacity in the heat concentration and distribution area 3 is vaporized when it is subjected to heat, and absorbs a great deal of heat during phase change. Thus, on one hand, it advantageously reduces the heat of the heat stream blasted from the pressure relief valve 10; on the other hand, the vaporized hot gas has a characteristic of autonomous upward flowing and stratification from the medium of large heat capacity, which contributes to the discharge of the hot gas to the exterior of the box through heat discharging structure while the medium of large heat capacity still remains at the bottom portion of the heat concentration and distribution compartment.

Furthermore, the medium of large heat capacity is a liquid medium with high fluidity for quickly balancing local high heat of the heat concentration and distribution compartment, and the medium of large heat capacity changes into a gas state through phase change and is discharged out of the box through the heat discharging structure when it is subjected to high heat, so as to maintain the heat concentration and distribution compartment below a preset heat threshold temperature.

It should be noted that there is no particular requirement or particular restriction on the specific material of the medium of large heat capacity in the present disclosure. For example, the medium of large heat capacity is optionally water, oil or a mixed oil-water liquid.

Furthermore, the medium of large heat capacity is configured with color.

It should be noted that the medium of large heat capacity being configured with color in the present disclosure refers to that the medium of large heat capacity itself is of color, or refers to that a color produced by adding a pigment to the medium of large heat capacity.

The heat concentration and distribution compartment in the present disclosure is arranged at the bottom of the battery box. Owing to the fact that the bottom of the battery box is the closest to the ground, it may be easily damaged and fractured by impact, and the damage or fracture may not be easily perceived. Since the medium of large heat capacity is arranged at the bottom of the box body, it will seep out of the box body 1 once the box body 1 is damaged and the water tightness of the box body is destroyed. Even though the liquid outside the box has dried up, the medium of large heat capacity with color can still leave a trace outside the box that is easy to be discovered, and defects of the heat concentration and distribution compartment can be discovered as soon as possible, and manual intervention and maintenance can be carried out conveniently.

Figure 2:
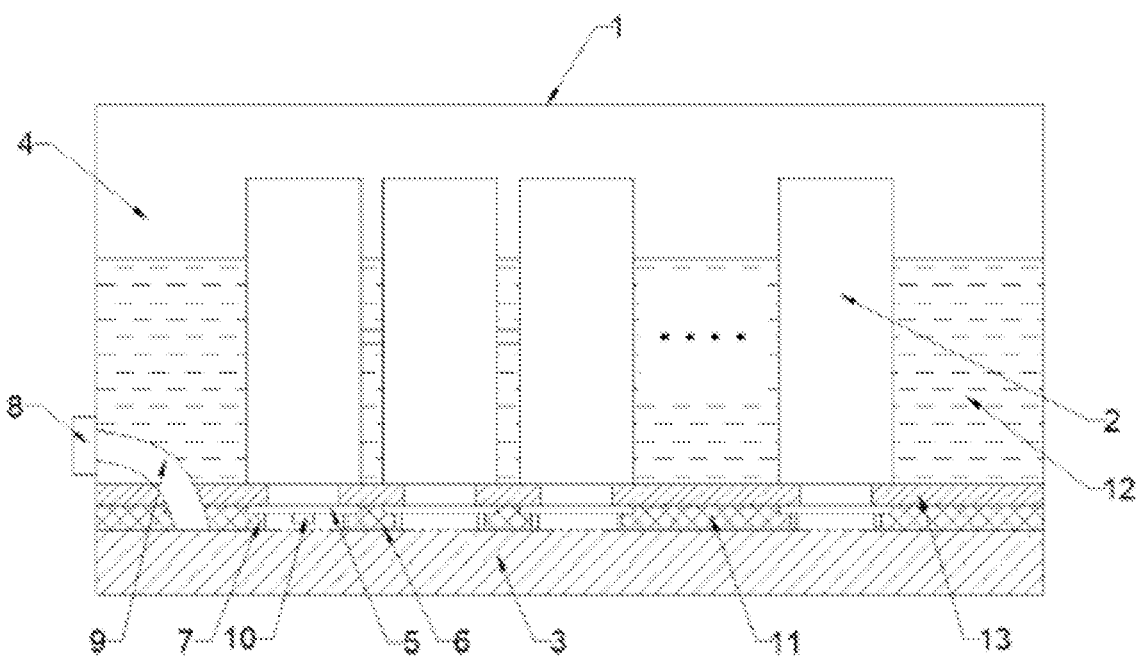
FIG. 2 is a structural schematic diagram of a heat directing structure provided in an embodiment of the present disclosure.

In another specific embodiment, the present disclosure provides a heat directing structure of a battery. As shown in FIG. 2, the heat directing structure comprises the battery box described above, wherein a heat-insulating adhesive layer 11 and a solid heat-insulating layer 13 are sequentially arranged on one surface of the heat separation plate near the battery compartment 4 from bottom to top, an end of each of the individual batteries 2 is fixed to the heat separation plate via the heat-insulating adhesive layer 11, and the solid heat-insulating layer 13 is filled between the shells of the individual batteries 2 near the end for heat insulation between the heating shell of the individual battery 2 in thermal runaway near the end and the portions of neighboring normal batteries 2 corresponding to the heating shell.

Furthermore, a fluid temperature equalizing layer 12 is further provided above the solid heat-insulating layer 13, and at least a portion of the shell of the individual battery 2 is immersed in the fluid temperature equalizing layer 12.

It should be noted that the heat-insulating adhesive layer 11 in the present disclosure is optionally polyurea. The materials of the solid heat-insulating layer 13 is optionally polyurethane or phenolic aldehyde, and the upper surface and/or lower surface of which are/is coated with an insulating film. The fluid temperature equalizing layer 12 is optionally silicone oil. Since the highly heat-insulating foam material is a polymer in powder form, which has the possibility of being dispersed under the continuous impact of a fluid, the lower surface of the foam material is sealed with a heat-insulating adhesive layer, and the upper surface of the foam material is sealed with an insulating film that has adhesive on one side.

In another specific embodiment, the present disclosure provides a method of directing heat for an individual battery 2 with the heat directing structure described above, said method comprises the following steps:

when an individual battery 2 overheats inside, a heat stream is blasted out via the battery pressure relief valve 10, then the heat stream enters the heat concentration and distribution area 3 through the heat directing area, in which the heat density of the heat stream will be decreased due to the first volume expansion of the heat directing area; in the heat concentration and distribution area 3, a second volume expansion is realized to decrease heat density and decrease the temperature after heat is collected, a hot gas is discharged out of the box body 1 through a heat discharging mechanism for realizing a third volume expansion and a temperature drop, thereby the heat directing of the heat stream in a stage-by-stage manner from the interior of the shell of the battery to a space outside the box body 1 is achieved;

blocking heat exchange between a heat concentration and distribution compartment with a great deal of heat and a battery compartment 4 at a normal temperature by a heat-insulating adhesive layer 11 and a solid heat-insulating layer 13.

The heat directing method according to the present disclosure further comprises the following steps: during the flow of the medium in the fluid temperature equalizing layer 12, the heat on the outer surface of the shell of the individual battery 2 in thermal runaway immersed in the fluid temperature equalizing layer 12 is quickly carried away and evenly distributed into the fluid temperature equalizing layer 12 and the large heat capacity of other normal individual batteries 2. Thus, the heat effect on the surfaces of the shells of the neighboring normal batteries is minimized.

The applicant declares that the embodiments described above are only some specific embodiments of the present disclosure, but the scope of protection of the present disclosure is not limited to those embodiments. Those skilled in the art should understand that any variations or replacements that could be readily envisaged by those skilled in the art within the technical scope disclosed by the present disclosure should be deemed as falling into the protection scope and the disclosed scope of the present disclosure.

The invention claimed is:

1. A battery box having a heat directing function, wherein the battery box comprises:
    a box body, an internal space of the box body is divided by a heat separation plate into a battery compartment in an upper portion and a heat concentration and distribution area in a lower portion; and
    at least one individual battery comprising an upper end face and a shell, wherein the upper end face is provided with a battery pressure relief valve, the individual battery is arranged in the battery compartment, and the upper end face is arranged towards the heat separation plate;
    wherein the heat separation plate is provided with a heat directing area, an outlet of the battery pressure relief valve corresponds to the heat directing area, and a heat stream discharged from the battery pressure relief valve enters the heat concentration and distribution area through the heat directing area;
    wherein the upper end face of the individual battery is at least further provided with a pole, and the poles of a plurality of individual batteries are electrically connected in series or in parallel through a busbar; and the busbar is arranged between the outlets of the battery pressure relief valves and the heat directing areas corresponding to the outlets;
    wherein the busbar is fixed to the periphery of the battery pressure relief valve of the individual battery through an electrical connecting element having a tubular structure, two ends of the electrical connecting element cover the battery pressure relief valve and the heat directing area respectively, side walls of the electrical connecting element, the battery pressure relief valve of the individual battery and the heat separation plate form a closed heat directing area, and the heat generated by the individual battery enters into the heat concentration and distribution area through the heat directing area after it is discharged from the battery pressure relief valve; and
    wherein the heat concentration and distribution area is provided with a medium of large heat capacity that is nonflammable, the medium of large heat capacity decreases the temperature of the heat concentration and distribution compartment by absorbing heat during temperature rise or phase change of the medium of large heat capacity after the medium of large heat capacity is subjected to heat.

2. The battery box according to claim 1, wherein a one-way communication structure is provided in the heat directing area at a position of the heat separation plate corresponding to the direction towards the heat concentration and distribution area, and the one-way communication structure is opened once it is subjected to a preset pressure or preset temperature at a side facing the heat concentration and distribution area.

3. The battery box according to claim 1, further comprising a heat discharging structure connected to the heat concentration and distribution area, wherein the heat discharging structure comprises a pressure relief pipe and a box body pressure relief valve, wherein one end of the pressure relief pipe is connected to the periphery of the heat concentration and distribution area to form a connection port that is located at a higher position in the heat concentration and distribution area, and the box body pressure relief valve is located at a connection end face between the pressure relief pipe and the heat concentration and distribution area, or located at the other end of the pressure relief pipe.

4. The battery box according to claim 3, wherein one end or a pipe body of the pressure relief pipe is intersected and connected with a wall of the box body to form a heat stream outflow opening; and some portions of the pressure relief pipe in a heat sensitive area inside or outside the box through which the pressure relief pipe passes is wrapped with a heat-insulating sleeve.

5. The battery box according to claim 1, wherein the heat concentration and distribution area is at least connected to a bottom portion of the box body; and
    the heat concentration and distribution area at least comprises a bottom compartment located in the bottom portion of the box body.

6. The battery box according to claim 1, wherein the medium of large heat capacity is a liquid medium having high fluidity for quickly balancing local high heat in the heat concentration and distribution area, and the medium of large heat capacity changes into a gas state during phase change when it is subjected to high heat and the medium is discharged out of the box through the heat discharging structure, so as to maintain the heat concentration and distribution area below a preset heat threshold temperature.

7. The battery box according to claim 1, wherein the medium of large heat capacity is configured with color.

8. The battery box according to claim 5, wherein the heat concentration and distribution area further comprises a lateral compartment that is located in at least one side wall of the box body, wherein the lateral compartment is located higher than the bottom compartment, and the lateral compartment is in communication with the bottom compartment.

9. A heat directing structure of an individual battery in thermal runaway, wherein the heat directing structure comprises the battery box according to claim 1, wherein a heat-insulating adhesive layer and a solid heat-insulating layer are sequentially arranged on one surface of the heat separation plate near the battery compartment from bottom to top, an end of each of the individual batteries is fixed on the heat separation plate via the heat-insulating adhesive layer, and the solid heat-insulating layer is filled between the shells of the individual batteries near the end for heat insulation between the heating shell of the individual battery in thermal runaway near the end and portions of neighboring normal individual batteries corresponding to the heating shell.

10. The heat directing structure according to claim 9, wherein a fluid temperature equalizing layer is further provided above the solid heat-insulating layer, and at least a portion of the shell of the individual battery is immersed in the fluid temperature equalizing layer.

11. A method for directing heat of an individual battery with the heat directing structure according to claim 9, the method comprising:
when an individual battery overheats inside, a heat stream is blasted out via the battery pressure relief valve, then the heat stream enters the heat concentration and distribution area through the heat directing area, in which the heat density of the heat stream will be decreased due to the first volume expansion of the heat directing area; in the heat concentration and distribution area, a second volume expansion is realized to decrease heat density and decrease the temperature after heat is collected, a hot gas is discharged out of the box body through a heat discharging mechanism for realizing a third volume expansion and a temperature drop, thereby the heat directing of the heat stream in a stage-by-stage manner from the interior of the shell of the battery to a space outside the box body is achieved; and blocking the heat exchange between the heat concentration and distribution area with a great deal of heat and the battery compartment at a normal temperature by the heat-insulating adhesive layer and the solid heat-insulating layer.

* * * * *